(12) United States Patent
Wheat et al.

(10) Patent No.: US 8,153,311 B2
(45) Date of Patent: Apr. 10, 2012

(54) METHOD AND APPARATUS FOR BURST DISK IDENTIFICATION

(75) Inventors: W. Spencer Wheat, Missouri City, TX (US); Vesna R. Mirkovic, Pearland, TX (US); Ralph S. Worsley, Brentwood Bay (CA)

(73) Assignee: Texaco Inc. and Texaco Development Corporation, San Ramon, CA (US)

( * ) Notice: Subject to any disclaimer, the term of this patent is extended or adjusted under 35 U.S.C. 154(b) by 1607 days.

(21) Appl. No.: 11/265,860

(22) Filed: Nov. 3, 2005

(65) Prior Publication Data

US 2006/0057438 A1    Mar. 16, 2006

Related U.S. Application Data

(62) Division of application No. 10/407,257, filed on Apr. 4, 2003, now Pat. No. 6,979,503.

(51) Int. Cl.
*H01M 8/00*    (2006.01)
(52) U.S. Cl. .................. 429/423; 429/432; 429/442
(58) Field of Classification Search .................. 429/423, 429/432, 442, 444, 454
See application file for complete search history.

(56) References Cited

U.S. PATENT DOCUMENTS

| 4,673,624 | A | 6/1987 | Hockaday |
| 5,731,101 | A | 3/1998 | Sherif et al. |
| 5,827,602 | A | 10/1998 | Koch et al. |
| 2002/0083646 | A1 | 7/2002 | Deshpande et al. |
| 2002/0088740 | A1 | 7/2002 | Krause et al. |
| 2002/0090326 | A1 | 7/2002 | Deshpande |
| 2002/0090327 | A1 | 7/2002 | Deshpande |
| 2002/0090328 | A1 | 7/2002 | Deshpande |
| 2002/0090334 | A1 | 7/2002 | Stevens et al. |
| 2002/0094310 | A1 | 7/2002 | Krause et al. |
| 2002/0098129 | A1 | 7/2002 | Martin et al. |
| 2002/0155329 | A1 | 10/2002 | Stevens |
| 2003/0071736 | A1* | 4/2003 | Brazier et al. ............... 340/614 |
| 2003/0235728 | A1* | 12/2003 | Van Zee et al. ............... 429/22 |
| 2004/0080297 | A1 | 4/2004 | Leboe |

* cited by examiner

*Primary Examiner* — Cynthia H. Kelly
*Assistant Examiner* — Monique Wills
(74) *Attorney, Agent, or Firm* — Frank C. Turner; Melissa Patangia; Christopher D. Northcutt (57) ABSTRACT

The present invention provides a method and apparatus for identifying an activation of a burst disk. A pressure data or a temperature data relating to a flow is received. A determination is made whether the flow is interrupted based upon the at least one of the pressure data and the temperature data. A burst disk activation is identified in response to determining that the flow is interrupted.

7 Claims, 6 Drawing Sheets

METHOD AND APPARATUS FOR BURST DISK IDENTIFICATION

This application is a divisional application of U.S. patent application Ser. No. 10/407,257, filed in the United States Patent and Trademark Office on Apr. 4, 2003.

BACKGROUND OF THE INVENTION

1. Field of the Invention

This invention relates generally to fuel cell reformers, and, more particularly, to identifying an activation of a burst disk relating to a fuel cell system.

2. Description of the Related Art

Fuel cells are showing significant promise for replacing conventional sources of power in a variety of contexts, including cars, buses, houses, commercial buildings, and the like. The three main arguments in favor of fuel cells are abundance, efficiency, and cleanliness. First, the primary fuel for fuel cells is hydrogen, which is the most abundant element in the universe. Second, the efficiency of a fuel cell may exceed the Carnot Cycle limit while operating at a relatively low temperature. For example, a fuel cell operating at 80° C. is typically two to three times as efficient as an internal combustion engine, which may also require substantially higher operating temperatures. Third, the by-products of fuel cell operations are typically benign. For example, water is the only by-product of a fuel cell powered entirely by hydrogen.

One common type of fuel cells is a polymer electrolyte membrane (PEM) fuel cell. This type of fuel cell may also be referred to as a proton exchange membrane fuel cell, a solid polymer electrolyte (SPE) fuel cell, or a polymer electrolyte fuel cell. In operation, hydrogen and oxygen are introduced into an anode and a cathode, respectively, of the PEM fuel cell. The hydrogen dissociates into electrons and protons, and the protons diffuse through an electrolyte membrane, such as a Nafion™ membrane produced by DuPont, that separates the anode from the cathode. When the protons reach the cathode, they react with the oxygen to form water and heat. The electrical current created by the movement of the protons generates a voltage difference of approximately 0.7 volts between the anode and the cathode.

There are, however, a number of drawbacks to using pure hydrogen as the primary fuel for a fuel cell. Hydrogen gas has a relatively low energy density and there is as yet no significant infrastructure for distributing the hydrogen gas. Although the energy density may be increased by liquefying the hydrogen, the process of liquefaction also adds to the overall cost of the hydrogen fuel. Furthermore, liquid hydrogen must be maintained at a low temperature and is therefore substantially more expensive to distribute than hydrogen gas. Thus, a number of alternative primary fuels have been proposed, including gasoline, methanol, ethanol, naphtha, and the like.

Thus, many types of fuels can be used, some of them hybrids with fossil fuels, but the ideal fuel is hydrogen. If the fuel is, for instance, hydrogen, then the combustion is very clean and, as a practical matter, only the water is left after the dissipation and/or consumption of the heat and the consumption of the electricity. Most readily available fuels (e.g., natural gas, propane and gasoline) and even the less common ones (e.g., methanol and ethanol) include hydrogen in their molecular structure. Some fuel cell implementations therefore employ a "fuel processor" that processes a particular fuel to produce a relatively pure hydrogen stream used to fuel the fuel cell. When using a primary fuel other than pure hydrogen, a reformer, also referred to as a fuel processor, is typically used to produce hydrogen from the alternative primary fuel. Three conventional reformer designs are steam reformers, partial oxidation reformers, and auto-thermal reformers. Steam reformers combine the alternative primary fuel with steam and heat to produce hydrogen. The heat required to operate the system is obtained by burning the alternative primary fuel or excess hydrogen from an outlet of the fuel cell. Partial oxidation reformers combine the alternative primary fuel with oxygen to produce hydrogen and carbon monoxide. The carbon monoxide then reacts with steam to produce more hydrogen. Partial oxidation releases heat, which may be captured and used elsewhere in the system. Auto-thermal reformers combine the alternative primary fuel with both steam and oxygen so that the reaction is in heat balance.

Within the reformers a pressure excursion can occur. In an attempt to prevent damage to the hardware connected to a reactor, know as the balance of plant and the reactor vessel itself, a pressure relief device known as a burst disk is employed to relieve pressure in the event of an excursion. Such a bust disk may contain a switch and electronic hardware to provide an indication of a rupture in the burst disk due to excessive pressure.

Generally, computing resources of a control system associated with the fuel system described above are to be utilized to constantly evaluate the status of these burst disks. State-of-the-art burst disks feature intelligent, complex hardware and I/O allocation in the control hardware to monitor the status of the hardware. This may utilize an resources that could otherwise be used for other operations in the system. Furthermore, additional equipment, such as hardware electronics are required for monitoring the operation of a burst disk This may increase the cost of employing such pressure relief features and/or affect the efficiency of the operation of the system.

The present invention is directed to overcoming, or at least reducing, the effects of, one or more of the problems set forth above.

SUMMARY OF THE INVENTION

In one aspect of the instant invention, a method is provided for identifying an activation of a burst disk. A pressure data or a temperature data relating to a flow is received. A determination is made whether the flow is interrupted based upon the at least one of the pressure data and the temperature data. A burst disk activation is identified in response to determining that the flow is interrupted.

In another aspect of the present invention, a fuel cell system is provided for identifying an activation of a burst disk. The fuel cell system of the present invention includes an oxidizer and a reformer operatively coupled to the oxidizer. The system also includes a burst disk to activate to provide a release of a reformate compound flowing within the reformer in response to a pressure excursion and a pressure sensor to provide pressure data associated with a flow associated with the reformer. The system also includes a controller operatively coupled to the pressure sensor. The controller is provided to detect a pressure excursion based upon the pressure data and to determine whether the burst disk has been activated in response to the pressure excursion.

In another aspect of the present invention, an apparatus is provided for identifying an activation of a burst disk. The apparatus of the present invention includes a controller operatively coupled to a burst disk. The controller is provided to receive a pressure data, determine whether a pressure excursion has occurred based upon the pressure data, and to determine whether the burst disk has been activated in response to a pressure excursion.

In yet another aspect of the present invention, a computer readable program storage device encoded with instructions is provided for identifying an activation of a burst disk. The computer readable program storage device encoded with instructions that, when executed by a computer, performs a method, which comprises: receiving at least one of a pressure data and a temperature data relating to a flow; determining whether the flow is interrupted based upon the at least one of the pressure data and the temperature data; and identifying a burst disk activation in response to determining that the flow is interrupted.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Embodiments of the present invention provide for monitoring a pressure transducer and/or a temperature transducer to determine whether an activation (e.g., a rupture) of a burst disk has taken place. In one embodiment, the burst disk, which is described in Figures and description provided below, referred to in the present invention may be formed in a round shape or any other shape that may be used to activate a release of matter in response to a build-up of pressure, and still remain with the spirit and scope of the present invention. In other words, the term "burst disk" may represent a variety of devices, which may have a variety of shapes, that are capable of being activated (e.g., ruptured) in response to a pressure excursion.

Embodiments of the present invention provide for a burst disk that is capable of rupturing/opening to allow for escape of materials that flow in a fuel system to relieve a pressure excursion. Down-line pressure transducers and/or temperature transducers may be used to evaluate or compare values to a predetermined threshold in order to make a determination whether a possible activation of the burst disk has taken place. Upon such a determination, a burst disk diagnostic may be employed to alert various components of a fuel system that a burst disk activation has taken place. Therefore, hardware exclusively designed for monitoring the burst disk may be reduced or eliminated in favor of pressure and/or the temperature sensors that generally are already available in the fuel system. Reducing the need for hardware dedicated to only limited specific purposes will, of course, reduce costs.

Embodiments of the present invention provide for monitoring of the fuel cell stack voltage while an electric load is applied to determine whether an activation of a burst disk has taken place. Embodiments of the present invention provide for a burst disk that is capable of rupturing/opening to allow for escape of materials that flow in a fuel system to relieve a pressure excursion. This relief in pressure will flow to the path of least resistance, avoiding the pressure drop present inside the fuel cell, diverting their flow to the oxidizer. This event will result in a loss of hydrogen rich reformate to the fuel cell stack and thus a drop in individual cell voltage, resulting in lower overall fuel cell stack voltage. Therefore, hardware designed for monitoring the burst disk may be reduced or eliminated due to an indication of a drop in voltage while a load is applied to the fuel cell stack.

Figure 1:
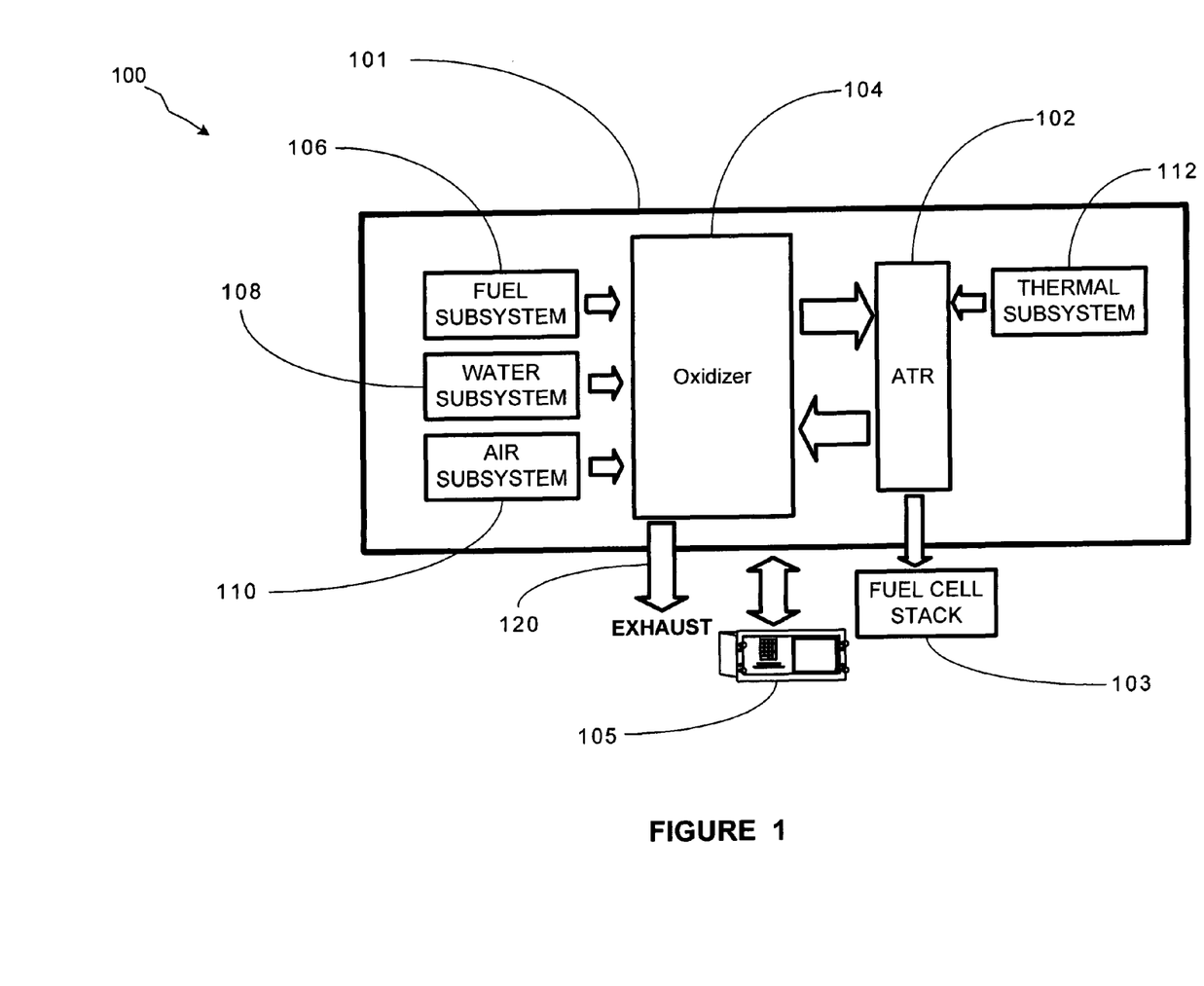
FIG. 1 illustrates a block diagram of a fuel system, in accordance with one illustrative embodiment of the present invention.

Turning now to FIG. 1, a fuel system 100 in accordance with embodiments of the present invention is illustrated. The system 100 comprises a fuel processor 101, a fuel cell stack 103 and a controller 105. In one embodiment, the controller 105 may comprise a computer system, which is described in FIGS. 5A and 5B and accompanying description below. In one embodiment, the fuel cell stack 103 may comprise a plurality of cells 130, wherein each of the cells 130 (see FIG. 2) be a proton exchange membrane (PEM) fuel cell, but other types of cells 130 may be utilized and remain within the spirit and scope of the present invention. In one embodiment, the cells 130 may be individual fuel cells. The present invention is not limited by the implementation of the fuel cell stack 103. Particularly, in the illustrated embodiment, the fuel processor 101 may comprise other modular physical subsystems described below.

The fuel processor 101 may comprise, inter alia, an auto-thermal reformer (ATR) 102. The ATR 102 is capable of performing an oxidation-reduction reaction that reforms a fuel input provided to the ATR 102 into a reformate compound, such as a reformate gas, which may be used by the fuel cell stack 103. The ATR 102 may comprise a reformate compound flow system that may utilize a burst disk to reduce a pressure excursion that may occur within the ATR 102. A more detailed description of the ATR 102 is provided below.

The fuel processor 101 may also comprise an oxidizer 104, which in one embodiment may be an anode tail gas oxidizer (ATO). Other types of oxidizers known to those skilled in the art having benefit of the present disclosure may be utilized and remain within the spirit and scope of the present invention. The oxidizer 104 is capable of mixing steam, fuel and air to create a fuel mixture that may be delivered as a process feed compound (e.g. a process feed gas) to the ATR 102. The fuel processor 101 may also comprise a fuel subsystem 106, a water subsystem 108, and an air subsystem 110. The fuel subsystem 106 is capable of delivering an input fuel to the oxidizer 104 for mixing into the process feed compound delivered to the ATR 102. The fuel subsystem 106 may provide natural gas, for example, to the oxidizer 104. The water subsystem 108 is capable of delivering water to the oxidizer 104 for mixing into the process feed compound delivered to the ATR 102. Similarly, the air subsystem 110 is capable of delivering a predetermined amount of air to the oxidizer 104 for mixing into the process feed compound delivered to the ATR 102. The fuel processor 101 may also comprise a thermal subsystem 112 that is capable of controlling various temperature zones in the operation of the ATR 102. It should be appreciated that a variety of fuels, such as any hydrocarbon, may be utilized by the fuel system 100.

Figure 2:
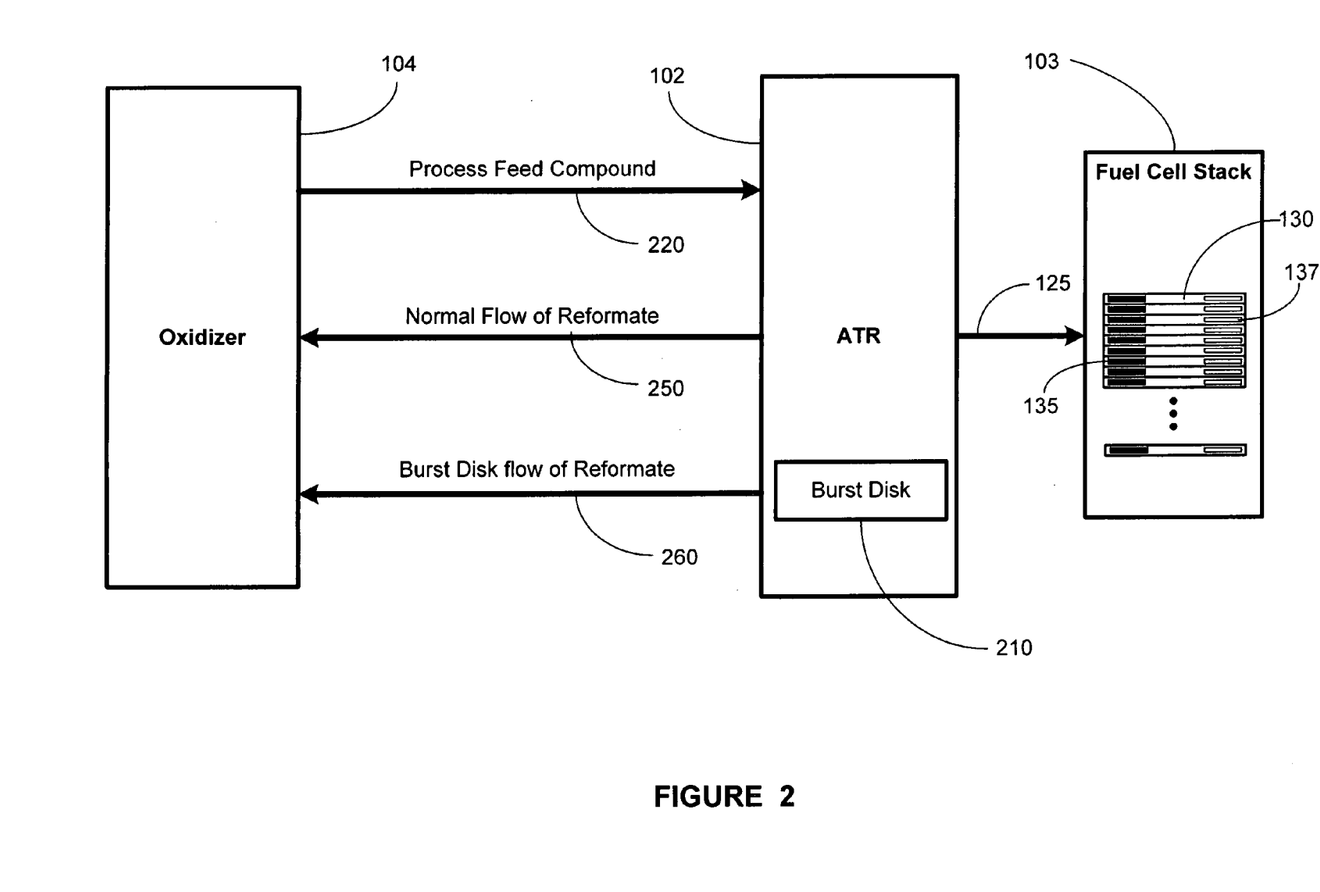
FIG. 2 illustrates a more detailed block diagram depiction of an interaction between an oxidizer and an auto-thermal reformer (ATR) of FIG. 1, in accordance with one illustrative embodiment of the present invention.

Turning now to FIG. 2, an interaction between the oxidizer 104 and the ATR 102 in accordance with embodiments of the present invention is illustrated. The oxidizer 104, as described above, provides a process feed compound on a line 220 to the ATR 102. The ATR 102 processes the feed compound and provides hydrogen for the fuel cell stack 103 on a line 125. The fuel cell stack 103 comprises a stack of a plurality of cells 130, each of which comprise an anode 135 and a cathode 137. A more detailed description of the ATR 102 is provided below. The ATR 102 comprises a burst disk 210 that is capable of interrupting the normal flow of a reformate substance circulating within the ATR 102 to provide an escape route for the reformate in response to a pressure excursion. The burst disk 210 may be implemented in a variety of shapes and sizes to provide an apparatus that is capable of activation or rupturing to release the reformate substance/compound in response to a pressure excursion. During the normal operation of the ATR 102 (i.e., during the absence of a pressure excursion) a normal flow of reformate substance may be directed back to the oxidizer 104 on a line 250 or to a fuel cell. However, upon experiencing a pressure excursion, the burst disk 210 is designed to become activated (e.g., rupture), relieving pressure, diverting flow back to the oxidizer 104 from the ATR 102 on a line 260.

Embodiments of the present invention provide for implementing a burst disk diagnostic to indicate to the system 100 that the activation of the burst disk 210 has occurred. Embodiments of the present invention provide for analyzing a pressure reading and/or a temperature reading to determine whether the activation of the burst disk 210 has occurred. This provides for utilizing a burst disk 210 with reduced components, such as sensors, other hardware electronics, software, and/or firmware electronics, and utilizing a burst disk 210 that merely reacts to a pressure excursion. The reformate compound received by the oxidizer 104 may be processed and excess compounds may be eliminated as exhaust on the line 120.

Figure 3:
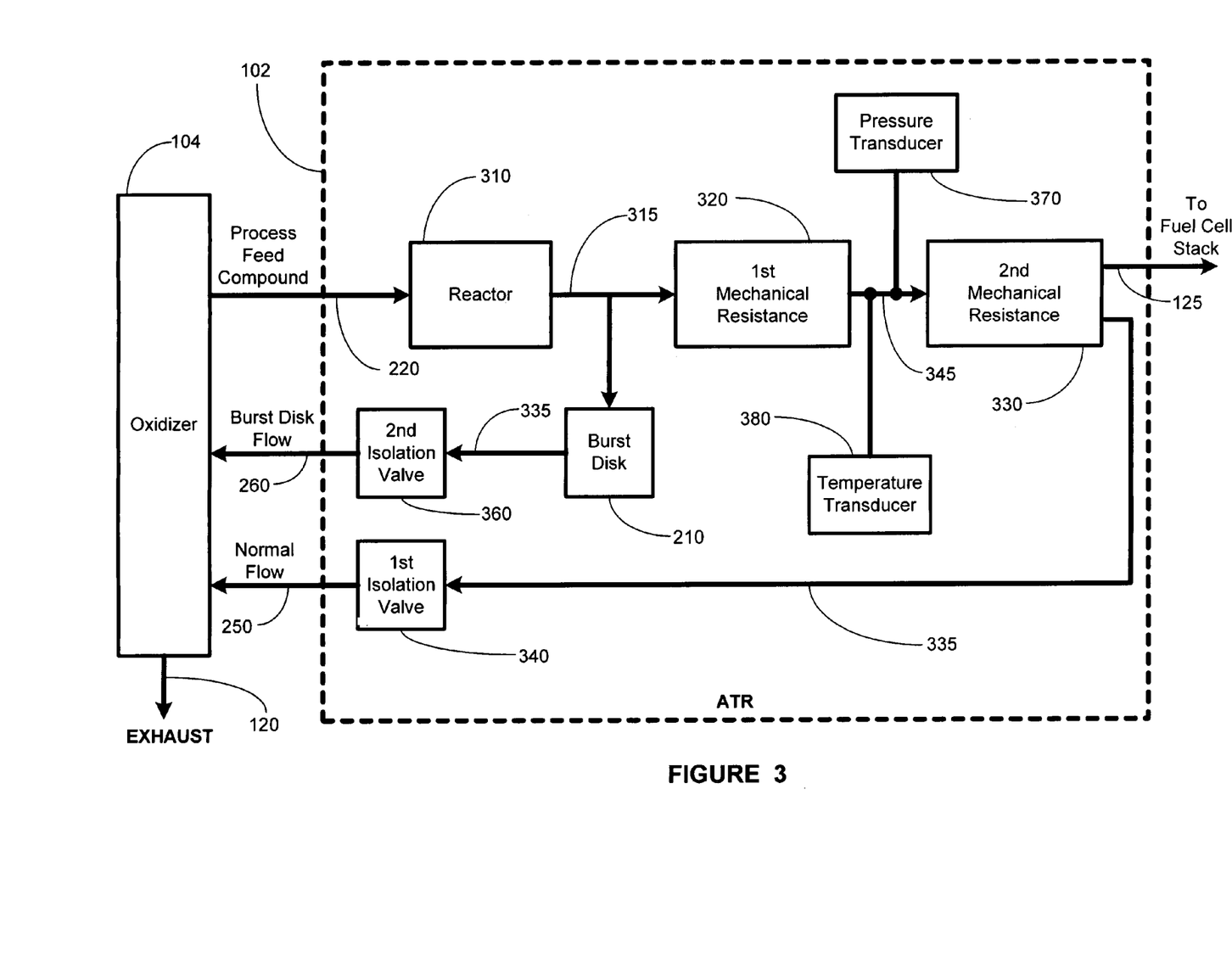
FIG. 3 illustrates a more detailed block diagram depiction of the ATR of FIG. 1, in accordance with one illustrative embodiment of the present invention.

Turning now to FIG. 3, a more detailed block diagram depiction of one embodiment of the ATR 102 is provided. The process feed compound on the line 220, from the oxidizer 104, is received by a reactor 310. The reactor 310 provides a reformate compound flow on the line 315. The reformate compound from the reactor 310 is sent to a first mechanical resistance 320 on the line 315. A flow from the first mechanical resistance 320 may be followed by a flow to a second mechanical resistance 330 on a line 325. More detailed depictions of the first and second mechanical resistances 320, 330 are provided in FIG. 4 and accompanying description below.

The flow of compound from the second mechanical resistance 330 may be sent to a first isolation valve 340 via a line 335. The first isolation valve 340 may then direct the compound back to the oxidizer 104 on the line 250. An output from the ATR 102 may be sent to anodes 135 of cells 130 in the fuel cell stack 103 (see FIG. 2). The output from the second isolation valve 360 is sent to the oxidizer 104 on the line 260.

In the event that a pressure excursion occurs on the line 315, the burst disk 210 is activated (e.g., ruptured) to divert flow from the line 315, out to the oxidizer 104. The burst disk 210, in response to the pressure excursion on the line 315, and provides a flow of the reformate compound to a second isolation valve 360 via a line 355. The second isolation valve 360 is then provided to the oxidizer 104 via the line 260, which carries the burst disk flow of reformate compound to the oxidizer 104. The oxidizer 104 subsequently processes the excess reformate compound.

When the burst disk 210 is activated, the flow in the ATR 102 is disturbed, which may cause a drop in the voltage of one or more cells 130 in the fuel cell stack 103. Therefore, it is useful to note when the activation of the burst disk 210 has occurred because corrective or compensative steps may be implemented. In other words, a drop in voltage of one or more cells 130 may also be used as an indication that an activation of the burst disk 210 has occurred. The reformate compound flowing through the burst disk 210 is processed by the oxidizer 104 and sent out as exhaust on the line 120, but this event may not be noted by the system 100 without additional electronics and sensors associated with the burst disk 210. Added electronics and sensors, however, may increase the cost of implementing the ATR 102 and increase the overall inefficiencies in the system 100.

The ATR 102 also comprises a pressure transducer (or sensor) 370 and a temperature transducer (or sensor) 380. The pressure transducer 370 and the temperature transducer 380 may be provided on nodes located on the line 325 after the first mechanical resistance stage. The pressure transducer 370 and the temperature transducer 380 may comprise sensors that provide signals indicative of the pressure and temperature. The controller 105 may receive such signals from the pressure transducer 370 and/or the temperature transducer 380. During normal flow of the reformate compound throughout the ATR 102, the pressure and the temperature on the line 315 that is generally within a predetermined range.

Embodiments of the present invention provide for monitoring the pressure and the temperature signals provided by the transducers 370, 380. In one embodiment, such transducers 370, 380 may be present and employed for a multitude of processing tasks associated with operating the fuel processor system 100, and as an additional benefit, such readings may be used to determine whether the burst disk 210 has been activated. For example, if during normal flow of the reformate compound throughout the ATR 102, the pressure transducer 370 generally reads approximately 2 PSI, a sudden drop to approximately 0 or 0.5 PSI may be an indication that the burst disk 210 is active (i.e., the flow of reformate compound has been diverted from the line 315 through the burst disk 210 and into the oxidizer 104). This is true because if the burst disk 210 is activated, the flow on the line 315 will choose the route of the burst disk 210 to the second isolation valve 360 since that would be the path of least resistance as compared to the path to the first and second mechanical resistances 320, 330.

Additionally, a sudden temperature drop indicated by the temperature transducer 380 may also be indicative of the activation of the burst disk 210. For example, during normal flow of the reformate in the ATR 102, the temperature value read by the temperature transducer 380 may indicate approximately 80° C. If the burst disk 210 is activated, the flow on the line 315 would move towards the burst disk 210 and the temperature on the line 325 may drop from 80° C. to approximately 35° C. to 40° C. Upon detecting this sudden temperature drop, the controller 105 may be able to determine that the burst disk 210 has been activated. Generally, a sudden pressure drop may be easier to detect than a sudden temperature drop, due to the thermal mass, a temperature drop may take a longer period of time to detect, wherein a pressure drop could be recognized faster. Therefore, utilizing the readings from the pressure transducer 370 and/or the temperature transducer 380, a burst disk 210 that is activated may be identified efficiently. Since the controller 105 may be operatively coupled to a plurality of ATRs 102, this method may be used to readily identify an activated (i.e., ruptured) burst disk 210.

Figure 4:
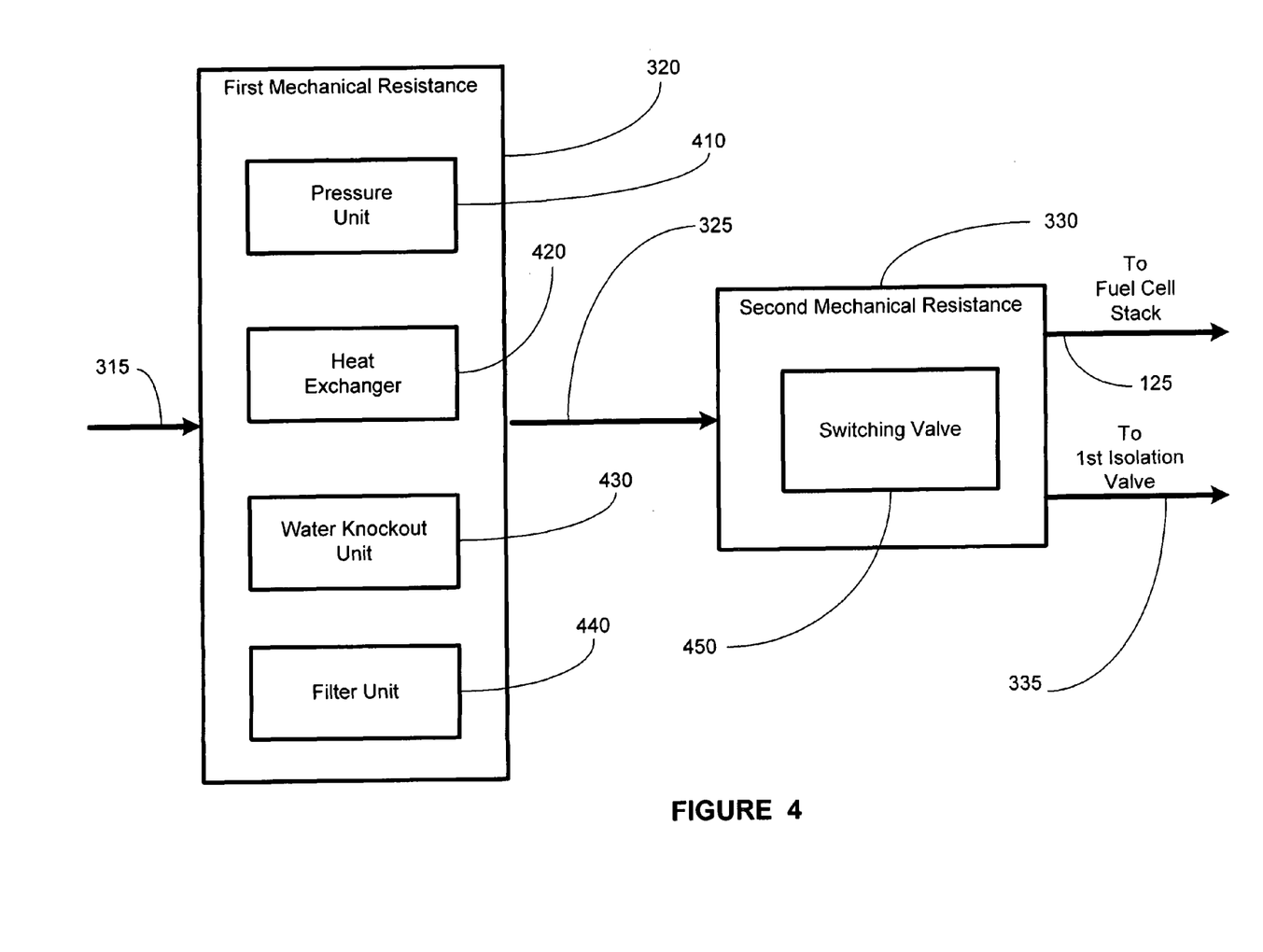
FIG. 4 illustrates a more detailed block diagram depiction of a first and second mechanical resistances of FIG. 3, in accordance with one illustrative embodiment of the present invention.

Turning now to FIG. 4, a more detailed block diagram depiction of the first and second mechanical resistances 320, 330 is illustrated. The first mechanical resistance 320 may comprise a pressure unit 410 that may provide a pressure drop on the flow of reformate through the lines 315 and 325. The first mechanical resistance 320 may also comprise a heat exchanger 420 that is capable of cooling the reformate compound before it is sent to the fuel cell stack 103. A plurality of heat exchangers may be included in the block 420. The first mechanical resistance 320 may also comprise a water knockout unit 430 that is capable of collecting condensate that results from the operation of the heat exchanger 420. Generally, the heat exchanger 420 may cool a substance that is approximately 100° C. down to approximately 80° C. Therefore, a 20° C. drop is experienced by components in the first mechanical resistance 320, resulting in the production of condensate that is collected by the water knockout unit 430.

Additionally, the first mechanical resistance 320 may comprise a filter unit 440. The filter unit 440 is capable of filtering various types of catalysts that may have been acquired during the process described above. Upon the above-mentioned processing performed by the first mechanical resistance 320, the reformate compound flows to the second mechanical resistance on the line 325. The second mechanical resistance 330 comprises a switching valve 450. The switching valve 450 is capable of switching a portion of the flow on the line 335 back to the oxidizer 104 and another portion of the flow (on the line 125), which may comprise substantially pure hydrogen, to the fuel cell stack 103. The pressure and temperature measurement for determining the status of the burst disk 210 is acquired from nodes located on the line 325. Upon activation (e.g., rupture) of the burst disk 210, the flow to the first mechanical resistance 320 may cease, therefore, the operation of the switching valve 450 may not provide adequate flow on the line 335 to provide the proper compound needed for the activation of a portion (one or more cells 130) of the fuel cell stack 103.

Figure 5A:
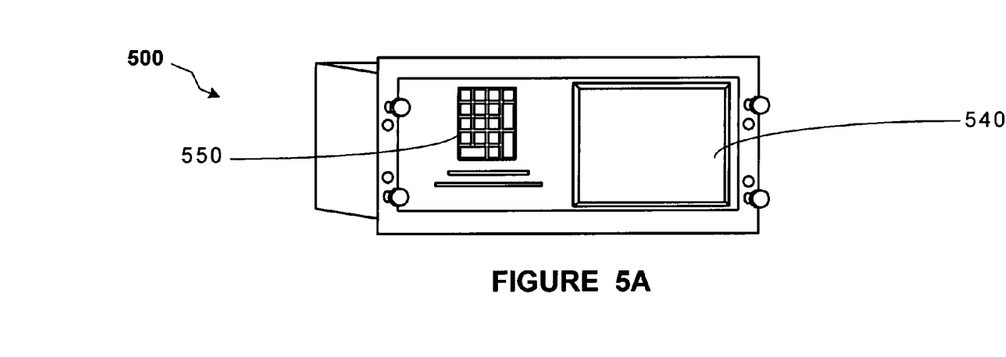
FIGS. 5A and 5B illustrate more detailed block diagram depictions of a controller of FIG. 1, in accordance with one illustrative embodiment of the present invention.
Figure 5B:
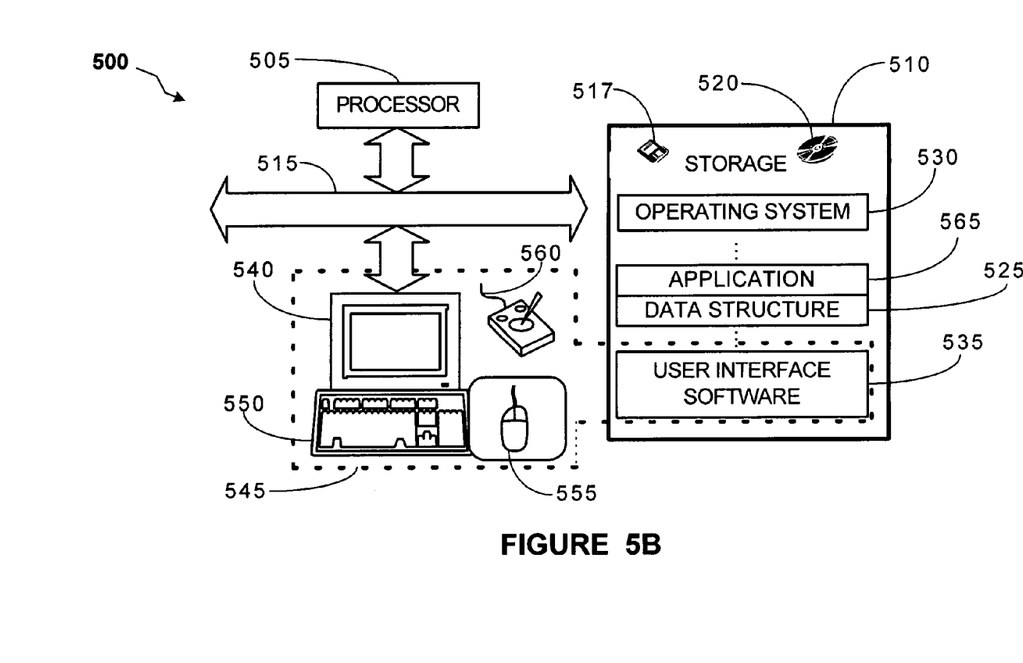

One particular embodiment of the controller 105 (first shown in FIG. 1), which may comprise a computer system 500, is illustrated in FIGS. 5A and 5B. The implementation of the computer system 500 is rack-mounted, but need not be rack-mounted in all embodiments. Indeed, this aspect of any given implementation is not material to the practice of the invention. The computer system 500 may be implemented as a desktop personal computer, a workstation, a notebook or laptop computer, an embedded processor, or the like. Moreover, the controller 105 may take the form of one or more hardwired controller, or a combination of hardwired controllers and computer systems.

The computer system 500 illustrated in FIGS. 5A and 5B includes a processor 505 communicating with storage 510 over a bus system 515. The storage 510 may include a hard disk and/or random access memory ("RAM") and/or removable storage such as a floppy magnetic disk 517 and an optical disk 520 may be inserted into the storage 510. The storage 510 is encoded with a data structure 525 storing the data set acquired as discussed above, which includes an operating system 530, user interface software 535, and an application 565. The user interface software 535, in conjunction with a display 540, implements a user interface 545. The user interface 545 may include peripheral I/O devices such as a key pad or keyboard 550, a mouse 555, or a joystick 560. The processor 505 runs under the control of the operating system 530, which may be practically any operating system known to the art. The application 565 is invoked by the operating system 530 upon power up, reset, or both, depending on the implementation of the operating system 530. In the illustrated embodiment, the application 565 is used to implement certain aspects of the present invention in a manner described more fully below. Note that the peripheral I/O devices 540, 550, 555, 560 can be used to implement a remote emergency shutdown switch for the fuel processor 100.

Figure 6:
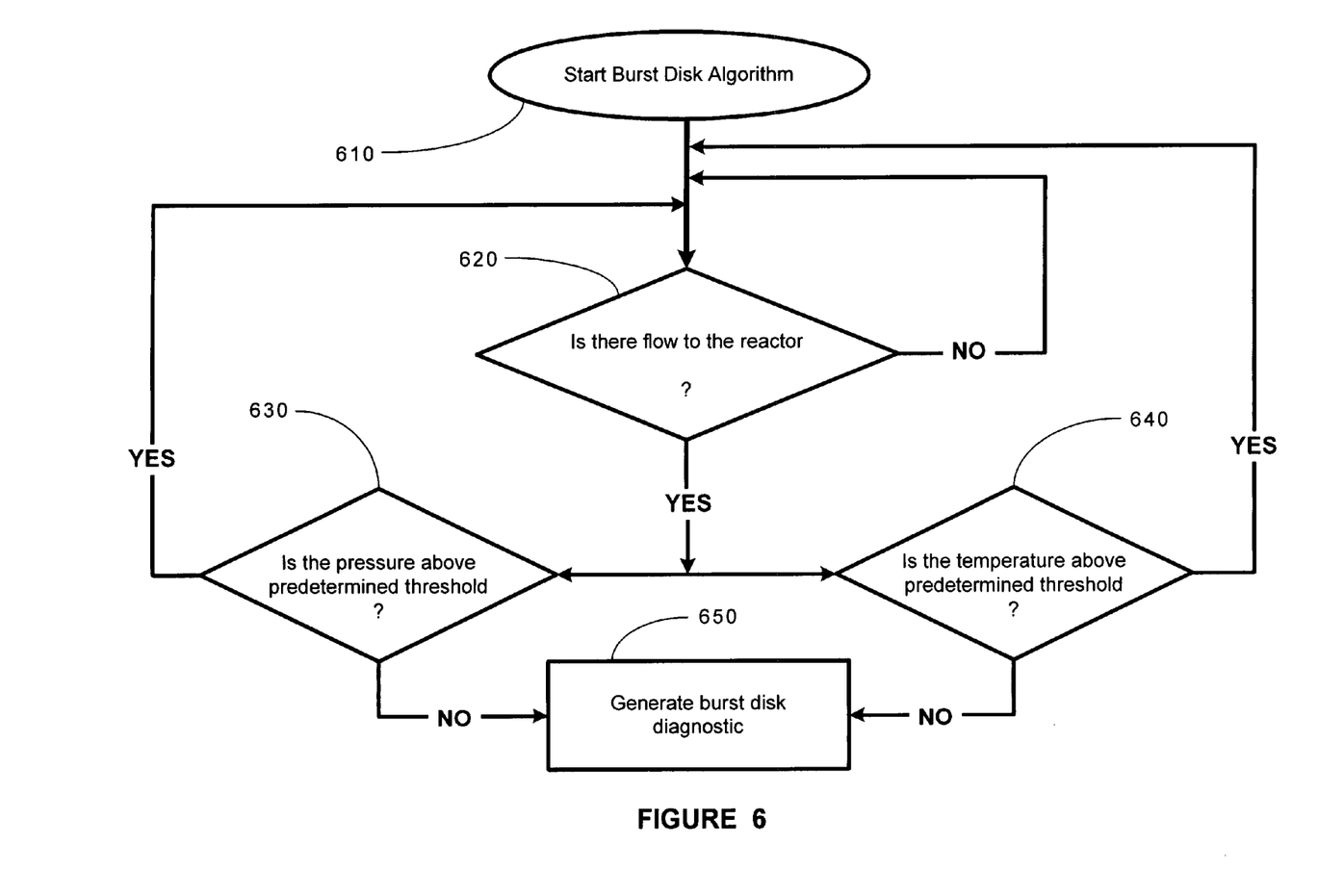
FIG. 6 illustrates a flowchart depiction of a method in accordance with one illustrative embodiment of the present invention.

Turning now to FIG. 6, a flow chart depiction of an algorithm that may be executed to implement embodiments of the present invention is illustrated. The controller 105 may implement a burst disk algorithm upon operation of the ATR 102 to implement a status check of the burst disk 210 (block 610). The controller 105 determines whether the flow to the reactor 310 in the ATR 102 is active (block 620). Upon a determination that the flow to the reactor 310 is not active, the burst disk 210 algorithm loops back and continues to check for the flow to the reactor 310. This loop continues as long as the flow to the reactor 310 is not active.

When the controller 105 determines that there is a flow to the reactor 310, the controller 105 will make two determinations. The controller 105 may determine whether there is pressure above a predetermined threshold (block 630). For example, the system 100 may determine whether the pressure is above or approximately 1.5 to 5 PSI on the line 325. In one embodiment, the predetermined pressure threshold is calculated based on an average pressure expected during normal flow in the ATR 102. Upon a determination that the pressure is above the predetermined threshold, the algorithm loops back to make sure that there is flow to the reactor 310, i.e., loops back to the position above block 620 to check for the flow to the reactor 310. However, when the controller 105 determines that the pressure is not above the predetermined threshold (i.e., the pressure drops below 1.5 PSI threshold), the controller 105 may invoke a burst disk diagnostic (at block 650). The burst disk diagnostic provides information to the controller 105, such information may include an identification of the particular burst disk 210 that is active (i.e., ruptured) as a result of a pressure excursion. Without the diagnostic, it would be more difficult to identify the active burst disk 210 and to react to the loss in voltage in a cell 130 in the fuel cell stack 103 caused by such an event.

Upon determining that the flow to the reactor 310 in the ATR 102 has begun (block 620), the controller 105 may also make a determination of whether the temperature on the line 325 is above a predetermined threshold (block 640). For example, the system 100 may determine whether the temperature on the line 325 is above 40° C. In one embodiment, the predetermined temperature threshold is based upon the expected average temperature during normal flow in the ATR 102. Upon determining that the temperature is above the predetermined threshold, the burst disk 210 algorithm loops back to make sure that there is flow to the reactor 310, i.e., loops back to the position above block 620 to check for the flow to the reactor 310. Software control will continue to loop back until a determination is made that the burst disk diagnostic should be generated. When the controller 105 determines that the temperature is not above the predetermined threshold, the algorithm generates the burst disk diagnostic described above (block 650).

Upon activation (e.g., rupture) of the burst disk diagnostic, the active (ruptured) burst disk 210 is identified. Accordingly, the system 100 may undertake appropriate compensative measures to correct the flow in the appropriate ATR 102. Additionally, using the methods described above, the appropriate cell 130 (in the fuel cell stack 103) that is below the expected voltage may be readily identified. The steps illustrated in FIG. 6 may be implemented using software, firmware, or hardware components, or a combination of two or more of the software, firmware, and hardware components.

Utilizing the pressure transducer 370 and the temperature transducer 380 described above, which are generally implemented in the ATR 102, an indication of the burst disk 210 being active is readily realized. This allows for the use of a simpler burst disk 210 without unnecessary hardware, firmware, and software implementations. This also relieves the controller 105 from having to constantly monitor each burst disk 210, thereby freeing valuable computing resources. Using the techniques described above, more efficient identification of an active (ruptured) burst disk 210 in a fuel cell system 100 may be realized. Utilizing embodiments of the present invention, a more efficient operation of the ATR 102 and the fuel cell stack 103 may be realized. The methods and apparatus provided above may be used in a variety of industrial application where flow of a compound is implemented.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
receiving at least one of a pressure data and a temperature data relating to a flow, wherein receiving said at least one of said pressure data and said temperature data relating to a flow comprises receiving at least one of a pressure data and a temperature data relating to a reformate flow in a reformer;
determining whether said flow is interrupted based upon said at least one of said pressure data and said temperature data;
identifying a burst disk activation in response to determining that said flow is interrupted; and
wherein determining whether said flow is interrupted comprises determining whether a voltage drop in a portion of a fuel cell is below a predetermined threshold.

2. The method described in claim 1, wherein receiving said at least one of said pressure data and said temperature data relating to a flow comprises receiving said at least one of said pressure data and said temperature data relating to a flow between a first mechanical resistance and a second mechanical resistance.

3. The method described in claim 1, wherein determining whether said flow is interrupted comprises determining whether said pressure data is below a predetermined threshold.

4. The method described in claim 3, wherein determining whether said pressure data is below said predetermined threshold comprises determining whether said pressure data indicates that the associated pressure is below about 0.5 PSI.

5. The method described in claim 1, wherein determining whether said flow is interrupted comprises determining whether said temperature data is below a predetermined threshold.

6. The method described in claim 5, wherein determining whether said temperature data is below said predetermined threshold comprises determining whether said temperature data indicates that the associated temperature is below about 40° C.

7. The method described in claim 1, wherein identifying a burst disk activation in response to determining that said flow is interrupted comprises identifying a burst disk that has ruptured.

* * * * *